Patented Oct. 22, 1929

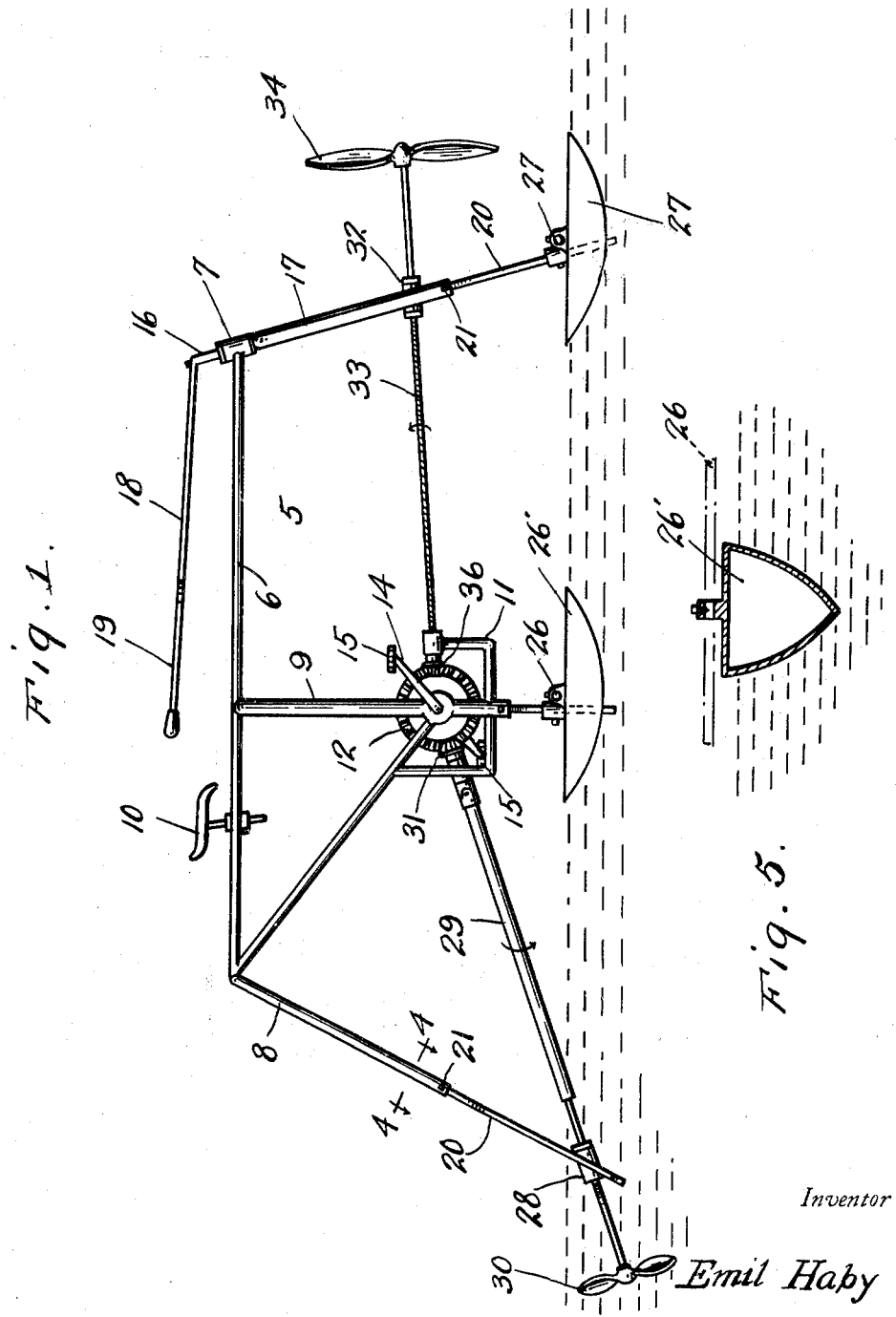

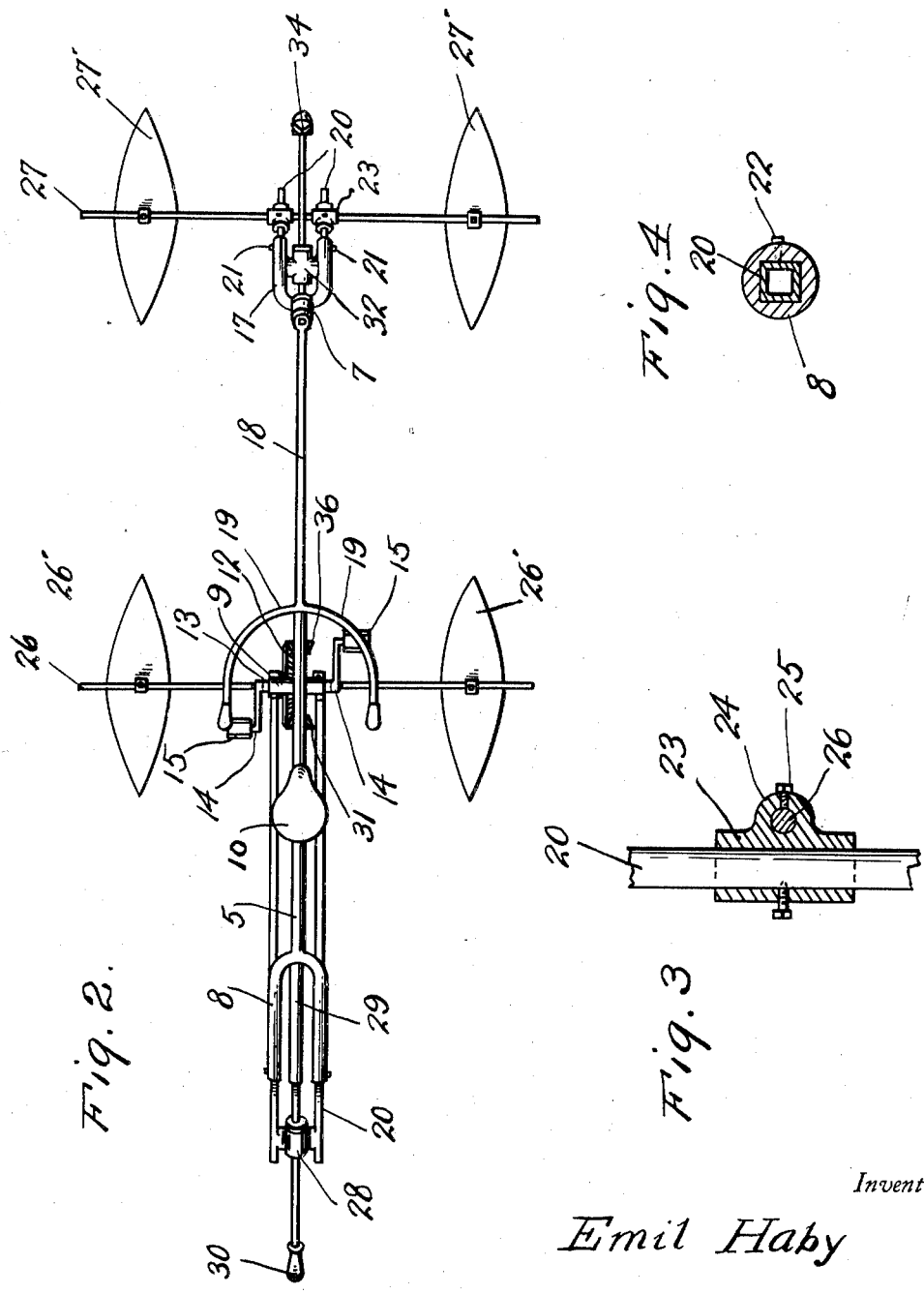

1,732,679

UNITED STATES PATENT OFFICE

EMIL HABY, OF LAMPASAS, TEXAS

AQUATIC VEHICLE

Application filed August 15, 1928. Serial No. 299,849.

This invention relates to new and useful improvements in aquatic vehicles and aims to provide a novel, simple and useful device whereby travelling may be expedited on water and wherein an individual may move from place to place upon a body of water without requiring the services of a motor or other character of boat.

A vehicle of this character will prove highly amusing to bathers as well as useful to those actually desiring to travel from one place to another upon a body of water.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a side elevation of my improved vehicle,

Figure 2 is a top plan view thereof,

Figure 3 is a vertical section through one of the adjustable coupling members for the front and rear pontoon supporting bars, Figure 4 is a detail transverse section taken substantially upon the line 4—4 of Figure 1 on a somewhat enlarged scale, more clearly disclosing the preferred type of adjustable connection between certain members of the vehicle frame and shaft and pontoon supporting units, and Figure 5 is a transverse section through the preferred type of pontoon employed in conjunction with the present device.

Now having particular reference to the drawings my novel aquatic vehicle consists of a frame 5 which includes generally a horizontal frame bar 6, the forward end of which is equipped with a vertically extending slightly inclined shaft bearing 7 the rear end thereof being constructed of depending and inclined supports 8, the lugs of which are hollow in construction.

Furthermore depending from the horizontal bar 6 of this frame slightly rearwardly of the center thereof is a fork 9 the legs of which are also hollow.

Arranged upon the horizontal frame bar 6 rearwardly of this fork 9 is a suitable seat 10. Associated with the lower end of the fork 9 is a small sub-frame 11 while mounted for rotation between the legs of this fork 9 adjacent their lower ends is a bevel gear 12 mounted upon a suitable shaft 13, the opposite ends of which are equipped with cranks 14 associated with the ends of which have suitable foot pedals 15.

Journaled within the bearings 7 at the forward end of the horizontal frame bar 6 is a shaft 16 the lower end of which is equipped with an inclined fork 17, the upper end thereof terminating into an elongated rearwardly extending bar 18 the end of which is constructed with suitable handle bars 19—19 that terminate slightly forwardly of said seat 10.

The bars of the legs of said forks 8, 9 and 17 are square shape as illustrated in Figure 4 while slidable therethrough are depending square shaped bars 20 adapted to be rigidly secured in predetermined adjusted position by set screws 21 threaded through openings in the legs of the fork by set screws 22.

Adjustably arranged upon the bars 20 associated with the foremost forks 9 and 17 are collars 23. Said collars are formed intermediate their ends with sleeves 24 each of which is equipped with a set screw 25.

Arranged horizontally through the sleeve of the collars associated with said forks 9 and 17 are cross bars 26 and 27 and adjustably arranged upon the opposite ends thereof are suitable pontoons 26'—26' and 27'—27'. These pontoons may be of any suitable design, preferably as disclosed.

Arranged between the bars 20 of the rearmost fork 8 at the lower ends thereof is an inclined shaft bearing 28 through which is journaled the rear end of an adjustable shaft 29 the extreme rear end of which is equipped with a water propeller 30.

As disclosed this shaft is inclined so that the rear end thereof together with the propeller will always be beneath the surface of the water, see Figure 1.

The forward end of this shaft 29 is journaled within the rear end of the sub-frame 11 and is equipped with a small beveled gear 31 that has mesh with said manually rotated beveled gear 12 with the obvious result that the turning of the said gear 12 will cause the actuation of the propeller 30.

Arranged between the legs of the foremost fork 17 is a shaft bearing 32 through which is journaled a shaft 33, the major portion of which is flexible while the forward end thereof is equipped with an air propeller 34.

The rear end of this shaft is journaled within a bearing associated with the forward end of the frame 11 and is equipped inwardly of this bearing with a bevel gear 36 that has mesh with the manually controlled gear 12 so that the rotation of this gear will also cause the rotation of the air propeller 34.

It will thus be seen that I have provided a novel, simple and useful aquatic vehicle that is well adapted for all of the purposes heretofore designated and even though I have herein shown and described the invention as consisting of certain detail structural elements it is nevertheless to be understood that changes may be made therein without affecting the spirit and scope of the appended claims.

Having thus described my invention, what I claim as new is:

1. In an aquatic vehicle of the class described, a frame having a depending intermediate fork and a depending inclined fork at its rear end, a vertically inclined depending fork mounted for rotation at its upper end within the forward end of said frame, a seat associated with said frame, steering means associated with the upper end of said foremost fork, supporting pontoons associated with the lower end of said intermediate and foremost fork, a water propeller associated with the rear end of the frame and extending below the lower surface of said pontoon, an air propeller associated with the foremost fork and manually operable means whereby to cause the rotation of said propeller.

2. In an aquatic vehicle of the class described, a frame having a depending intermediate fork and a depending inclined fork at its rear end, a vertically inclined depending fork mounted for rotation at its upper end within the forward end of said frame, a seat associated with said frame, steering means associated with the upper end of said foremost fork, supporting pontoons associated with the lower end of said intermediate and foremost fork, a water propeller associated with the rear end of the frame and extending below the lower surface of said pontoon, an air propeller associated with the foremost fork and manually operable means whereby to cause the rotation of said propeller, means between the pontoon and said fork whereby the pontoons may be raised or lowered with respect to the fork and means between the water propeller and said frame whereby said propeller may be raised and lowered then complement to the adjustment of said pontoon.

3. In an aquatic vehicle of the class described, a frame having a depending intermediate fork and a depending inclined fork at its rear end, a vertically inclined depending fork mounted for rotation at its upper end within the forward end of said frame, a seat associated with said frame, steering means associated with the upper end of said foremost fork, supporting pontoons associated with the lower end of said intermediate and foremost fork, a manually controlled gear mounted for rotation between the legs of the intermediate fork forwardly and rearwardly extending shafts associated with the frame and operatively associated at their inner ends with said gear, a water propeller upon the rear end of the rear shaft and an air propeller upon the forward end of the foremost shaft.

In testimony whereof I affix my signature.

EMIL HABY.